Figure 1:
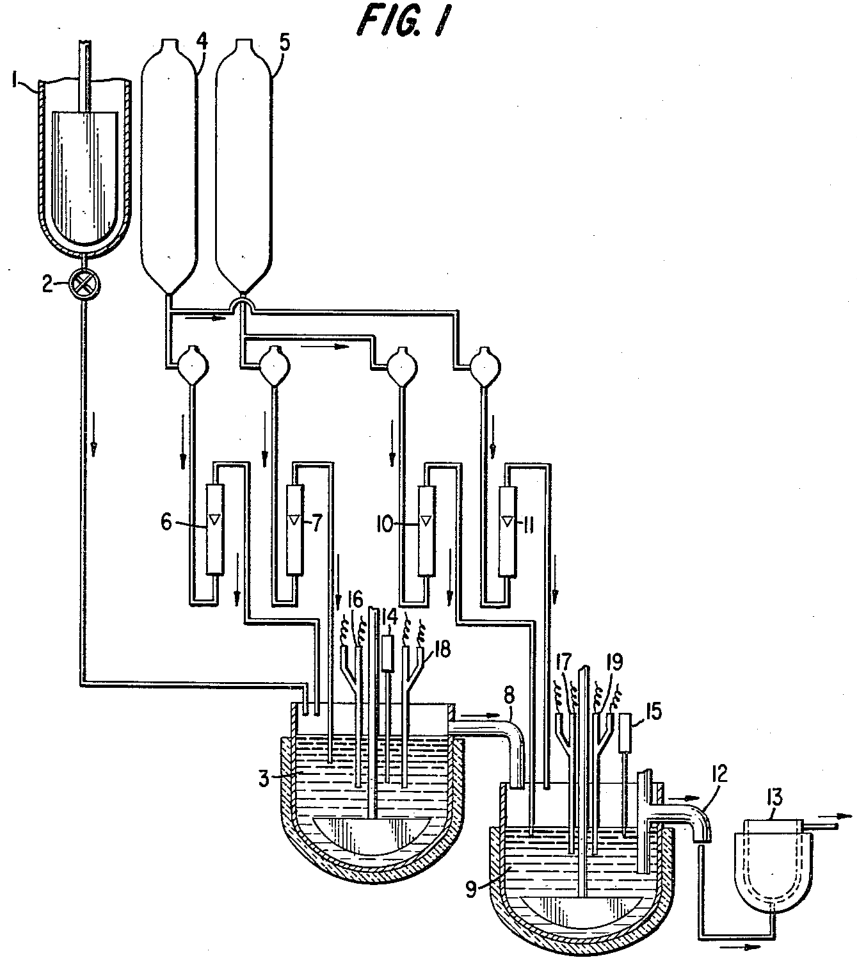

Jan. 14, 1964 H. HUPFER 3,117,954

CONTINUOUS DIAZOTIZATION

Filed Sept. 25, 1959 2 Sheets-Sheet 1

INVENTOR
HEINZ HUPFER

BY Curtis, Morris & Safford
ATTORNEYS

INVENTOR
HEINZ HUPFER

BY Curtis, Morris & Safford
ATTORNEYS

United States Patent Office 3,117,954
Patented Jan. 14, 1964

3,117,954

CONTINUOUS DIAZOTIZATION

Heinz Hupfer, Frankfurt am Main, Germany, assignor to Farbwerke Hoechst Aktiengesellschaft vormals Meister Lucius & Brüning, Frankfurt am Main, Germany, a corporation of Germany Filed Sept. 25, 1959, Ser. No. 842,525
Claims priority, application Germany Oct. 14, 1955
3 Claims. (Cl. 260—141)

The present invention relates to the continuous diazotization of amines. This application is a continuation-in-part of my copending application Serial No. 614,963, filed October 9, 1956.

Diazotization reactions have been known for almost 100 years and have been applied in a large scale in the manufacture of organic products, particularly in the manufacture of dyes, medicines, or intermediate products thereof. The annual production of diazo compounds is said to amount to tens of thousands of tons. According to Römpp, Chemie Lexikon, 1958, page 394, the production of azo-dyestuffs in the United States of America was as high as 37 percent of the total coal-tar dyestuff production which in 1954 was estimated at 70,000 tons. Thus, the need for applying a space-saving and economical continuous diazotization process in the manufacture of diazo-compounds has existed for a long time.

The proposal to use a continuous diazotization process for the manufacture of diazo compounds or solutions thereof has heretofore been made only once. Chenicek et al., who describe in U.S. Patent 2,714,104 certain diazotization reactions, point out on lines 31 et seq. in column 5 of said patent that the diazotization may also be carried out in a continuous manner. The technical measures described by them, namely the introduction of the reaction components into a vessel provided with cooling devices or with devices that are suitable for introducing Dry Ice and drawing off the reaction mixture, however, represent measures which are self-evident and which represent by no means instructions for an operation on an industrial scale. Especially the cooling with Dry Ice does not represent a solution which is applicable on an industrial scale because it involves the risk that the reaction mixture may foam over and that the nitrous gases may be dragged along by the evaporating carbon dioxide.

There is indeed no case known in which the continuous method of diazotization would have been used in the production of diazo compounds or their solutions; that may be due to the fact that the experts considered such a method as practically not feasible. Such a premature judgment may be understood when considering the difficulties involved in continuous operations.

These difficulties are presented by the fact that the criterion for the termination of the desired reaction in diazotizations is a remaining excess quantity of free nitrous acid. In order to reach this final composition of the reaction mixture, which should be attained as exactly as possible since an excess of nitrous acid, particularly too large an excess, may disturb in the processing of the reaction mixture and would have to be removed by a special treatment with, for example, urea, whereas any additional consumption of diazotizing agent should be avoided for economical reasons, it is in the most cases absolutely necessary to stoichiometrically adjust as exactly as possible the amounts of amine to be diazotized and of diazotizing agent, mostly an aqueous solution of sodium nitrite.

Hence, the rate of consumption of nitrite often serves as measure for the purity of the amine to be diazotized, as the purity of this amine is often varying since it is a commercial product, or it serves as measure for the content of desired diazo compound in the finished reaction mixture and hence for proportioning the reactants for following processing steps, for example coupling and the like.

In discontinuous operations, the remaining excess of nitrous acid as criterion for the completion of the reaction is very exactly determined by spot tests on test paper, for example, on potassium iodide starch paper. This method is not suitable for continuous operations and, above all, does not furnish such data as would permit automatic control of the feed of diazotizing agent.

In continuous diazotization, it is thus necessary to maintain at least at one determined place of the apparatus the reaction mixture in a composition which corresponds to the desired final state with as small tolerances as possible. Prerequisite for a successful diazotization is thus a method that not only permits of promptly determining the existence of free nitrous acid, but that also furnishes data on the actual concentration of diazotizing agent on the basis of which the feed of diazotizing agent can be controlled automatically.

It is known that the measurement of the reduction-oxidation potential by means of a platinum-calomel electrode arrangement can be used for determining the final point in titrimetric content determinations of amines by diazotization in the presence of hydrochloric acid (cf. Müller and Dachselt, Z. F. Elektrochemie, 31, 662 (1936)). At first sight this method appeared to be the required measuring method for continuous operations.

A closer investigation of the findings of Müller et al., however, reveals another picture. The potential measured during the titration rises namely in a curve, which in its last part is steeply ascending, to a maximum value which may be considered as being the criterion of the final point of diazotization, and then decreases when further amounts of nitrite are added. Thus, there are obtained according to Müller and Dachselt no unequivocal data of the potential just in that range in which there have to be continuously made measurements when continuously operating, since one would be able to deduce from these data whether they show a deficient or an excess amount of diazotizing agent only when following the potential curve by diazotizing in discontinuous manner. From these data cannot be deduced whether the feed of diazotizing agent must be slowed down or increased. In addition, the present state of the art with regard to the precision of dosage devices, for example pumps, etc. hitherto reached does not yet permit avoiding certain deviations from the desired final value, and such a precision can even not be expected in view of the steepness of the potential curve just in proximity of the desired theoretical value. This means, however, that on the basis of the findings of Müller et al. it could not at all be expected to reach in continuous operations a stoichiometrical adjustment of the components by means of the potential measurement, not to speak of such an adjustment as is guaranteed by means of spot tests which is applied and required in discontinuous operations on an industrial scale. Thus, for the above reasons, the reduction-oxidation potential measurement was considered as being an unsuitable means for the regulation of continuous operations, particularly for the automatic control of continuous operations, although it is in principle suitable for discontinuous operations.

The reason for the fall in potential after completed diazotization is still unknown. Müller and Dachselt tried to explain it as being solely the action of the nitrous acid, which, however, seems improbable in view of the inertness of the platinum towards nitrous acid and nitrous oxides. I assume that this phenomenon is due to the fact that the platinum is not sufficient resistant to nitrosyl chloride. It is strange, however, that according to my findings other metals and alloys of the platinum group known to be resistant to nitrosyl halides or aqua regia proved to be unusable for reduction-oxidation potential measurements in diazotizations.

Also other reasons spoke against the usability of the platinum electrode in continuous operations. It is known that platinum electrodes may be damaged or "contaminated" after measuring so that they furnish reproducible values only after having been treated with concentrated acid and/or glowed. Such a treatment was often necessary (Kalauch, Pharmacie 9, 640 (1954), and Bock et al., Zeitschrift für anorganische und allgemeine Chemie 273 Nos. 1–2, 8 (1953)), and it was the reason that platinum electrodes were not used in continuous measurements. Although Müller et al. do not expressly mention such a regenerating treatment of the electrode, I am led to assume on the basis of my experiences with platinum electrodes in discontinuous operations, that they obtained the reproducible value-curves only by using electrodes which were each time regenerated.

It is clear that the experts were not incited in view of the described difficulties and the prejudice derived therefrom to examine whether the reduction-oxidation potential measuring method might nevertheless be suitable for the automatic controlling of continuous diazotizations.

In my copending application Ser. No. 614,963, now abandoned, it has been described that the reduction-oxidation potential measuring arrangement behaves in the crucial range otherwise in continuous diazotizations than in discontinuous diazotizations.

When introducing into an apparatus provided for continuous operation at first a solution of an amine, if necessary an acid, and a diazotizing agent in a quantity which at first is not sufficient for a complete diazotization but which is then slowly increased, there can be reached in the same manner as did Müller et al., in a curve, which in its last part is steeply ascending, a peak value at which the reaction mixture flows off in the desired composition, i.e. with a minimum excess of free nitrous acid. The fact that this value which ought to be maintained does not correspond with the figure found by Müller et al. although the same amine is used is of no importance for the operation. This deviation is caused by modifications of the diffusion potentials due to different stream conditions in the proximity of the electrodes, or by other differences in construction of the apparatus as well as differences of concentration of the solutions and of the pH value.

Now, if the feed of nitrite is increased beyond the necessary amount so that a reaction mixture flows off which has a larger excess of nitrous acid than desired, there does not follow an immediate fall in potential as would have to be expected according to the findings of Müller et al., but, on the contrary, a further steep increase to 700 mv. and more. Only if the feed of nitrite is still further increased or if the excess of nitrite is maintained over too long a period, there follows a slow decrease in potential but the platinum electrode then proves to be irreversibly damaged and must be regenerated by glowing. If, however, the unavoidable variations in dosage are held within those limits where this may not occur by attentively regulating manually the feed or by using a sensitive and sufficiently rapid-reacting automatic control of the feed, the reduction-oxidation potential data obtained represent simple and direct measures of that amount of diazotizing agent which is deficient or in excess. Hence, it represents just that means which permits of carrying out diazotizations with the precision of proportioning required in the industry. The control of the feed of diazotizing agent, or the control of the feed of the base in case the feed of diazotizing agent is held constant, can be automatic by, for example, making the recorded potential value proportionally vary the volume of a dosage pump, for example, by a pneumatic device.

The reasons for the different behaviour of the platinum electrode in continuous operations are likewise not yet known. I assume that the fall in potential after the surpassing of the maximum occurring according to Müller et al. upon further addition of diazotizing agent is caused by a charge of the surface of the platinum electrode with nitrosation or oxidation products which are easily reducible only in the first period of their formation and only if the nitrous acid or the nitrosyl chloride does not exert too strong an action. In continuous operations, these surface chargings which are formed at first in smallest amounts react either with the fresh amine which is constantly fed to the electrode or with such impurities of the amine as have a reducing action, whereby the surface of the metal is regenerated. Such a behaviour of the metal surface has not been known up to now and likewise has not been expected.

In applying this effect to a process on an industrial scale, it has been described in my copending application Ser. No. 614,963 that it is possible to prepare diazo compounds and solutions thereof by contacting continuously and simultaneously at the usual diazotization temperature a diazotizable amine and an alkali nitrate and, if necessary an inorganic acid, and drawing off the reaction product that has formed in correspondence to the feed of the components. The operation is so conducted that when the feed of amine is held constant, the rate of feed of diazotizing agent is controlled by the potential measured by a reduction-oxidation measuring arrangement of known structure to accord with the desired composition of the final product, i.e. in such a manner that the rate of feed is increased if the potential measured is below the determined theoretical value, or if the feed of diazotizing agent is held constant, the rate of feed of the amine is correspondingly so regulated that the feed is slowed down if the potential measured is below the theoretical value and the feed is increased if the potential exceeds the theoretical value.

In case, however, the amines and their salts, respectively, are only sparingly soluble in the reaction medium and, therefore, must be processed in the form of a suspension and particularly those, which have to be worked up in coarse distribution and even in different and varying grain size due to the technical products available, working in a single reaction vessel according to my copending application Ser. No. 614,963 raises considerable difficulties. In such cases the amounts of reaction components cannot be exactly stoichiometrically adjusted by measuring the redox potential. Even with small throughputs the reaction mixture still contains free nitrous acid and unreacted particles of the amine and the amine salt, respectively.

Now a process for the continuous diazotization of amines sparingly soluble in the reaction medium and, therefore, being processed in the form of a suspension avoiding the above-mentioned draw-backs has been found, wherein the stoichiometrical amounts of amine and diazotization agent are adjusted by currently measuring the redox potential to maintain a predetermined potential value. This process comprises continuously introducing an amine, an inorganic acid and a diazotization agent into a series of reaction vessels connected to one another by an overflow, maintaining in said vessels a predetermined circulation of the reaction medium that allows sedimentation of undissolved coarse particles and transfer of dissolved and finely suspended particles to the next reaction vessel in order to complete the reaction and continuously withdrawing the reaction products.

The diazotization may be carried out in several cascaded stirring vessels or several cycles arranged in series or in combinations of the two kinds of plants. All these sets of apparatus are provided with devices for the introduction of the reaction components and measurement of the diazotizing agent and of the acid.

Sedimentation in the vessels can be obtained by suitable choice of the stirring effects, for example, by a suitable choice of the stirring rate and the form of the stirring device, or, if the flow is cycled, of the rate of circulation and/or the control of the cycling flow. This sedimentation causes the particles of the base, according to their size, to remain in the vessels for such a period as is necessary for complete reaction or dissolution, so that a reaction mixture, which is completely clear or free from base particles, leaves the last vessel.

If bases are used, which are not liable to undergo side reactions with nitrous acid and whose rate of reaction is so high that only insignificant residual proportions of the amine have to be reacted in the following vessel so that the risk that nitrous oxides may escape during stirring or cycling is negligible, the necessary amount of diazotizing agent can be introduced wholly into the first vessel.

In other cases it has proved useful to introduce a portion of diazotizing agent and, if necessary, of acid in determined amount into one or several of the following vessels.

Figure 2:
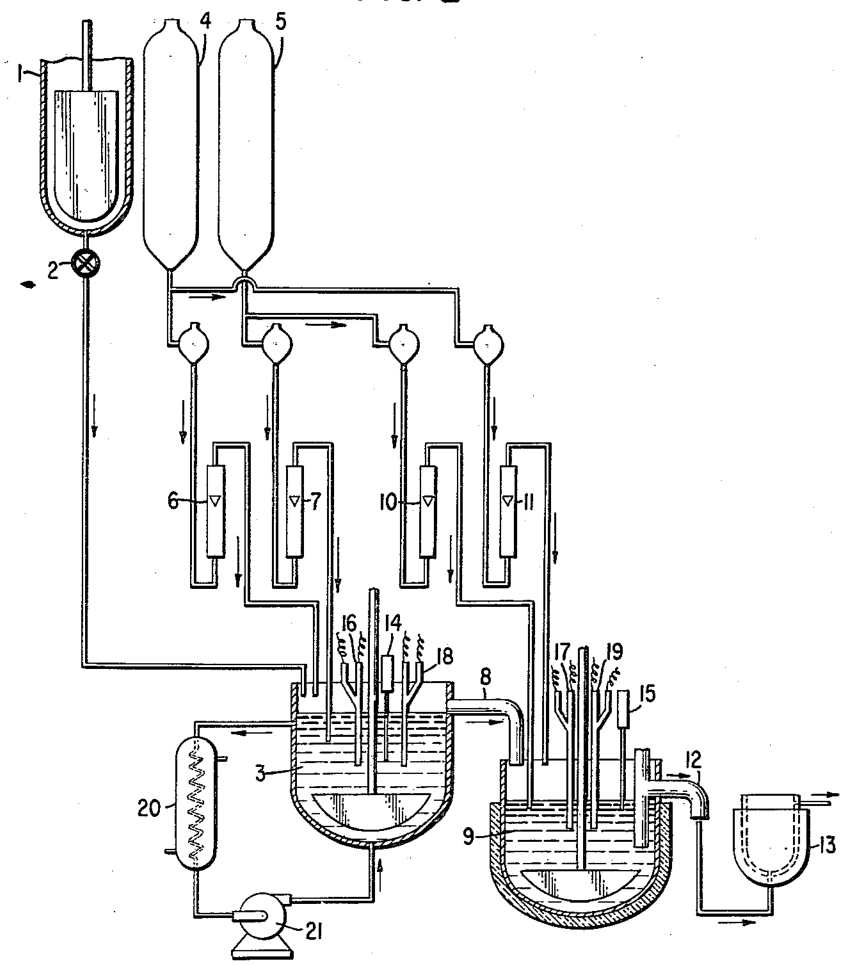

The continuous diazotization can be carried out in a plant as illustrated diagrammatically in the accompanying drawing in which FIGURE 1 is a diagrammatic showing of a preferred arrangement for carrying out the diazotization of difficultly diazotizable amines. FIGURE 2 is a diagrammatic showing of a further modified arrangement in which a separate cooling cycle is included.

The following examples serve to illustrate the invention, but they are not intended to limit it thereto:

*Example 1 (See FIGURE 1)*

Referring to FIGURE 1, the suspension of a base which is sparingly soluble in the diazotization medium is conducted from the stirring vessel 1 by means of a bucket wheel 2 in a dosed stream into the first reaction vessel consisting of a stirring vessel 3 provided with a cooling jacket. Acid and diazotizing agent pass from the measuring vessels 4 and 5 by way of dosage devices and rotameters 6 and 7 into the same stirring vessel, the diazotizing agent being conveyed below the surface of the liquid. The reaction mixture formed flows through an overflow tube 8 into the second reaction vessel 9 being analogous to the first one, in which the last portions of the amine are dissolved by subsequent diazotization. A branch line for the diazotizing agent leads from the measuring vessel 5 by way of dosage device and rotameter 10 into the reaction vessel 9. If necessary, the same pipe line for acid can be arranged at the measuring vessel 4 by way of rotameter 11.

The finished reaction mixture leaves the reaction vessel 9 by way of an immersion tube 12 and an after-reaction vessel 13.

Both reaction vessels 3 and 9 are provided with temperature measuring points 14 and 15, and, if necessary, with electrode arrangements 16 and 17 measuring the pH and oxidation reduction electrode arrangements 18 and 19, the measured values of these arrangements being used for regulating the supply of coolant, acid and diazotizing agent in a known manner by control of the dosage device by means of conventional automatic proportioning and control apparatus.

The described apparatus, whose reaction vessels 3 and 9 are provided with gold-calomel electrode arrangements of known type, is filled with dilute hydrochloric acid cooled to 0° C. Into the stirring vessel 1 there are introduced unground 3-nitro-amino-toluene and water at a proportion by weight of 1 (base=100%):8.4. Into the reaction vessel 3 there are continuously introduced per hour an amount of the suspension corresponding to 286 grams of amine and 540 grams of hydrochloric acid (30%) and in addition, while maintaining a temperature of 0–2° C., such a quantity of an aqueous sodium nitrite solution of 40 percent strength into both reaction vessels that in both vessels the measured concentration of nitrous acid in the reaction mixture is maintained in the region of the concentration which should be contained in the finished reaction mixture. This is achieved by maintaining the oxidation-reduction electrode arrangements in both reaction vessels by means of a nitrite solution at a potential of about 685 millivolts. In general, the theoretically calculated quantity of nitrite is required. About 96 percent of this quantity is used in the reaction vessel 3. The yellow diazo solution flowing off blues filter paper impregnated with a diamidophenyl-methane-sulfone solution is rendered turpid by impurities and does not carry any orange-coloured crystals of nitroamino-toluene.

*Example 2 (See FIGURE 2)*

The first reaction vessel for the continuous diazotization shown in FIGURE 2 is equipped with means for circulating the contents. The reaction mixture is continuously drawn from the stirring vessel 3 by way of a cooling system 20 and, by means of a rotary pump 21 conducted again to the vessel. Otherwise, the apparatus of FIGURE 2 is the same as described in Example 1.

This system is particularly suitable for amines diazotizing somewhat more quickly. In this system and under the conditions of Example 1 dry ground and air-sifted 3-nitro-4-amino-toluene is worked up with the same result but at a higher output.

I claim:

1. In a process for the continuous diazotization of amines, wherein the end point of the diazotization reaction is potentiometrically monitored and additional amine and nitrous acid reactants are added to the reaction mixture in response to potentiometric measurements to maintain a constant measured potential, the improvement of continuously introducing into a first of two potentiometrically monitored reaction vessels, in response to potentiometric measurements, (1) an aqueous suspension of particles of a sparingly soluble amine, (2) an inorganic acid, and (3) an alkali nitrite, to maintain a constant measured potential in said first vessel, circulating the reaction mixture in said first vessel such that undissolved coarse particles of said amine form a sediment settling in said first reaction vessel, withdrawing diazotized amine, unreacted nitrous acid, and suspended fine particles of unreacted amine by overflow into a second reaction vessel, completing diazotization of said amine in said second vessel by continuously introducing further inorganic acid and alkali nitrite thereinto, in response to potentiometric measurements, to maintain a constant measured potential in said second vessel, and continuously withdrawing diazotized amine from said second vessel.

2. A process as in claim 1 wherein the reaction mixture is circulated in said first reaction vessel by stirring.

3. A process as in claim 1 wherein the reaction mixture is circulated in said first reaction vessel by withdrawing a portion of the mixture and reintroducing it into said first vessel by pumping.

References Cited in the file of this patent

UNITED STATES PATENTS

| | | |
|---|---|---|
| 2,478,767 | Locke | Aug. 9, 1949 |
| 2,714,104 | Chenicek et al. | July 26, 1955 |

OTHER REFERENCES

Mueller et al.: "The Potentiometric Control of Diazotization and the Determination of Amines," C.A., volume 20 (1926), p. 1369.